United States Patent [19]
Peoples

[11] 3,788,272
[45] Jan. 29, 1974

[54] APPARATUS FOR TREATING A FLUX COATING

[75] Inventor: Richard A. Peoples, Hamburg, N.Y.

[73] Assignee: Bethlehem Steel Corporation, Bethlehem, Pa.

[22] Filed: Nov. 1, 1971

[21] Appl. No.: 194,593

Related U.S. Application Data

[62] Division of Ser. No. 780,062, Nov. 29, 1968, Pat. No. 3,635,748.

[52] U.S. Cl.............................. 118/47, 117/46 FA
[51] Int. Cl.......................... C23c 13/02, C23c 3/00
[58] Field of Search ................. 118/47, 420; 117/46

[56] References Cited
UNITED STATES PATENTS

| | | | |
|---|---|---|---|
| 1,732,504 | 10/1929 | Davis | 118/47 X |
| 2,967,114 | 1/1961 | Mayhew | 117/46 FZ |
| 3,055,768 | 9/1962 | Lassiter | 118/47 X |
| 3,322,558 | 5/1967 | Turner | 117/46 FZ |

FOREIGN PATENTS OR APPLICATIONS

| 377,096 | 12/1939 | Italy | 117/46 FC |
|---|---|---|---|

Primary Examiner—Louis K. Rimrodt
Attorney, Agent, or Firm—Joseph J. O'Keefe

[57] ABSTRACT

An apparatus for providing a smooth coating of flux material uniformly distributed on a metal surface comprising directing a flame onto the flux coated surface. The apparatus comprises a flame distributor adapted to contact the surface of the flux coating with a high-heat flame. The impingement of the flame on the flux surface causes an initial set in the flux surface which is smooth and evenly distributed.

4 Claims, 2 Drawing Figures

PATENTED JAN 29 1974 3,788,272

APPARATUS FOR TREATING A FLUX COATING

This is a division of application, Ser. No. 780,062, filed Nov. 29, 1968, now U.S. Pat. No. 3,635,748, granted 1/18/72.

BACKGROUND OF THE INVENTION

The preparation of metal strip for metal-coating comprises applying a flux base to the substrate or basic metal strip. Heretofore this has been accomplished in the following manner. The metal strip or strand-like material is advanced through a bath of the fluxing mateial. Upon leaving the flux bath the strip is directed through a series of metering rolls and levelling brushes to smooth and meter the flux application, thence into a heating chamber where the open flames confined within the chamber walls thoroughly dry the flux on the metal strip. The strip is further directed through another heating chamber which raises the temperature of the fluxed strip before it engers the bath of molten metal coating.

The wringer or metering rolls used to meter the flux tend to wear quickly due to the constant traveling of the sheet across the roll surfaces. When the metering rolls become worn the flux application is non-uniform resulting in coating problems. The levelling brushes which follow the metering rolls are used to smooth out or level the flux solution on the advancing strip. The action of the brush surface on the still liquid fluxed coating causes bubbles to form, creating an uneven flux coating when the flux coated strip emerges from the drying oven.

It is an object of this ivnvention to provide a method of treating the flux coating on an advancing strand-like material to insure a smooth and even flux surface.

It is a further object of the instant invention to provide improved apparatus for applying an even coating of flux on the surfaces of an advancing metal strip.

SUMMARY OF THE INVENTION

The instant invention accomplishes these objects by impinging the surface of the flux coating with a high-heat flame to provide a quick set of the outer layer of flux coating and apparatus to implement this method. A quick set insures against runback or dripping of the flux material and formation of bubbles or other uneveness of the coating. The flux coated strip is then advanced through a conventional drying oven or heating chamber where the flux layer is completely dried prior to passing over guide rolls on its way to further processing for the final coating operation.

DESCRIPTION OF THE PREFERRED EMBODIMENT

Figure 1:
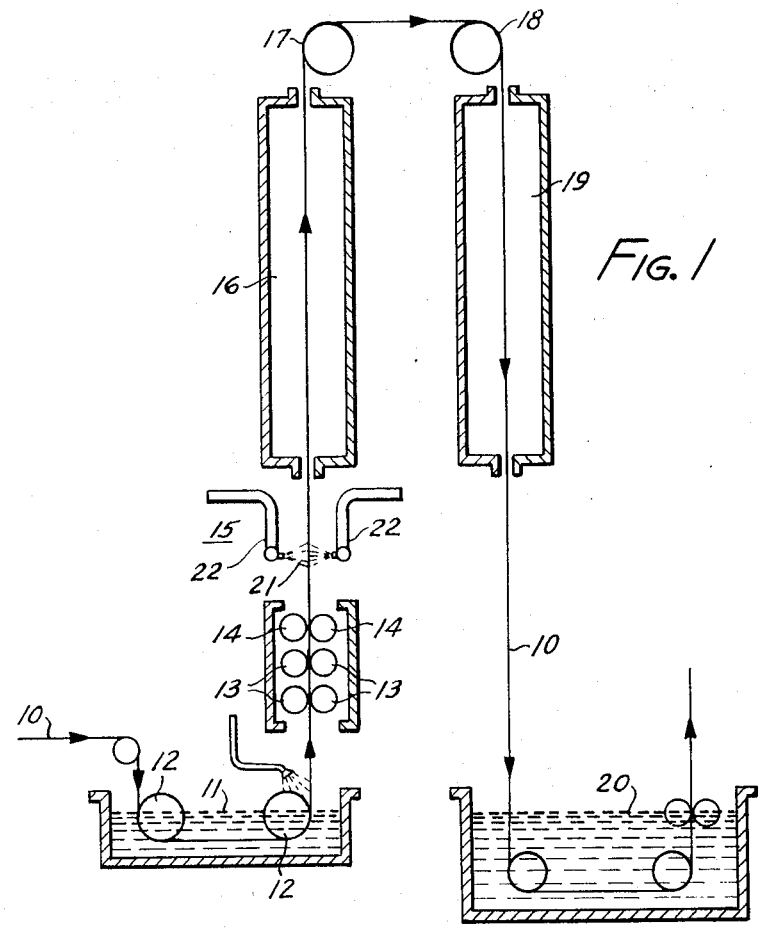
FIG. 1 is a diagrammatic elevational view of apparatus for coating a strand-like article.

The invention will now be described in detail with particular reference to the drawings. FIG. 1 is a diagrammatic view of the apparatus including the instant invention for fluxing and coating metal strip. The strip 10 is seen advancing through a bath 11 of aqueous flux solution guided therethrough by guide rolls 12. The strip 10 exits from the bath 11 and advances vertically upward through a series of metering rolls 13 and levelling brushes 14 which are mounted externally of the bath 11 and which distribute the flux coating substantially uniformly on the surfaces of the strip. Upon emerging from the series of metering rolls and levelling brushes the advancing strip passes between a set of opposing high-heat direct-fired flame burners 22 to be described later in more detail. Immediately thereafter the advancing flux coated strip enters a drying chamber 16 containing open flame burners, not shown, which dry the flux coating on the strip or strand-like substrate. The strip 10 is then passed over guide rolls 17 and 18 thence into a second heating chamber 19 and finally into and through the bath 20 of the coating material.

Figure 2:
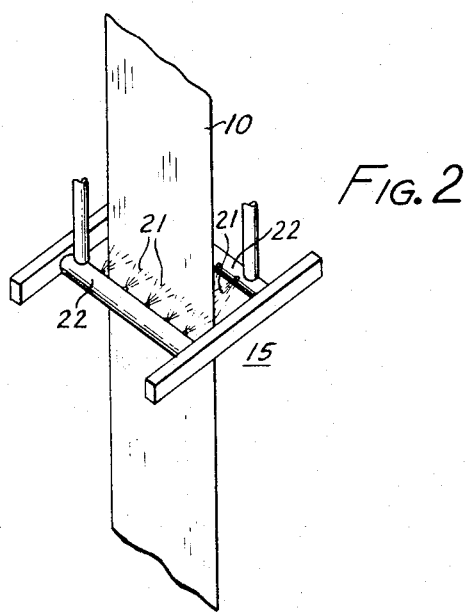
FIG. 2 is a view in perspective of a portion of the apparatus according to the instant invention.

Referring now to FIG. 2 which shows a perspective view of the burner unit 15 the strip is seen being impinged directly by a high-heat flame. The high-heat flames 21 are created by an air and gas mixture which is directed through spaced nozzles or openings in opposing flame distributors 22 which are mounted one on each side of the advancing strip 10 and the transversely coextensive therewith. The burner unit 15 which comprises athe flame distributors 22 is seen mounted in close proximity to the exit of the strip 10 from the flux bath 11. This arrangement is necessary so that the layer of flux adhering to the strip surfaces is evenly distributed and quick set before dripping or runback can occur.

The intimate contact of the high-heat flame impinging on the flux surface turns the bubble into steam effecting a flash evaporation, thereby smoothing said surface. Passage of the flux coated strip through drying chamber 16 immediately following the quick set provides a thorough drying of the flux coating on the substrate thus preventing damage to the now stable coating as it passes over the guide rolls 17 and 18 to further processing. The flames in the drying chamber 16 do not contcthe strip merely supplying heat to the drying chamber 16. It is important that a high-heat flame be impinged on the liquid flux surface more or less directly. It is obvious however that the high-heat flame can perform its task equally well if placed at an angle to the strip if desired. The action of the high heat flame impingement has a doctoring effect thus spreading the flux evenly as the bubbles are evaporated and this results in eliminating at least some of the metering rolls.

Although the descriptio has referred to my novel treatment as applied to strip, it should be understood that any strand-like article such as wire is equally adapted to be so treated and is within the purview of the invention

I claim:

1. In apparatus for treating a flux coating on a moving metal strand-like article upon leaving a bath of the fluxing solution, the improvement comprising:
   a. means in close proximity to the point of exit of the strand-like article from the flux bath for directing a flame on to the flux coating on the surface of the moving metal strand-like article to smooth the coating, eliminate bubbles therefrom and completely dry the surface, and
   b. means for drying the flux coating.

2. In apparatus according to claim 1, the means according to subparagraph (a) comprising:
   a flame distributor having a plurality of burners mounted on opposite sides of and transversely coextensive with the advancing strand-like article and adjustable to vary the angle of impingement of the flame on the flux coating.

3. In apparatus for treating an advancing metal strand-like article in preparation for metal-coating the article, including means for applying a coating of fluxing material to the article surface, the improvement comprising:
   a. flame distributors having a plurality of burners mounted on opposite sides of and transversely coextensive with the advancing strand-like article near the point of exit of the strand-like article from the coating means adapted to impinge the flux surface with a flame to smooth the coating, eliminate bubbles therefrom and completely dry the surface, and
   b. a drying oven in juxtaposition to the flame distributors adapted to thoroughly dry the flux coating.

4. Apparatus for producing a smooth even flux coating on the surface of a moving strand-like article comprising:
   a. a bath of liquid fluix material,
   b. means for guiding the article through the bath,
   c. at least a pair of opposed rolls engaging the strand-like article externally of the bath and adapted to distribute a uniform flux coating on the article surface,
   d. a pair of opposed flame distributors having a plurality of burners mounted on opposite sides of the advancing strand-like article and transversely coextensive therewith adapted to impinge thesurface of the flux coating with a flame to smooth the coating, eliminate bubbles therefrom and completely dry the surface, and
   e. a drying oven in juxtaposition to the flame distributors adapted to thoroughly dry the flux coating.

* * * * *